United States Patent [19]

Torezan et al.

[11] Patent Number: 5,638,243

[45] Date of Patent: Jun. 10, 1997

[54] MISWIRING INDICATOR IN GROUND FAULT PROTECTION DEVICES

[75] Inventors: Edward M. Torezan, Irvington; Howard S. Leopold, Melville, both of N.Y.

[73] Assignee: Eagle Electric Manufacturing Co., Inc., Long Island City, N.Y.

[21] Appl. No.: 597,233

[22] Filed: Feb. 6, 1996

[51] Int. Cl.$^6$ ........................................... H02H 3/00
[52] U.S. Cl. ................... 361/42; 361/56; 361/84
[58] Field of Search ........................ 361/42, 44–50, 361/54, 82, 84, 56; 324/508, 509, 524; 340/638, 656

[56] References Cited

U.S. PATENT DOCUMENTS 4,618,907 10/1986 Leopold ................................. 361/45
5,363,269 11/1994 McDonald ............................. 361/45

*Primary Examiner*—Jeffrey A. Gaffin
*Assistant Examiner*—Ronald W. Leja
*Attorney, Agent, or Firm*—Kirschstein, et al.

[57] ABSTRACT

A ground fault protection electrical outlet with miswiring indication includes, besides a main outlet unit that includes a housing, a primary and a secondary pair of first and second electrical connectors accessibly arranged on the housing, two main switches respectively interposed between the first, and the second, connectors of the primary and secondary pairs and simultaneously switchable between their open and closed positions, and at least two electrical contacts located at the same side of the switches as the secondary connectors, an indicator circuit built into the main outlet unit and operative for indicating a miswiring situation in which the wires of a wire pair that supplies electrical current to the outlet unit are mistakenly connected to the connectors of the secondary pair. The indicator circuit includes a current-limiting resistor, an indicator device operative for emitting a discernible warning of the miswiring situation, and an auxiliary switch switchable between its open and closed states, all interposed in series in an electrical path permanently joined with the secondary connectors. The auxiliary switch is ganged with the main switches in such a manner that it is open when the they are closed so that no current can flow through the indicator device even if the miswiring exists, and closed when the main switches are open so that electric current can flow through the closed auxiliary switch and also through the indicating device to activate the latter but only in the event of the miswiring.

14 Claims, 2 Drawing Sheets

MISWIRING INDICATOR IN GROUND FAULT PROTECTION DEVICES

BACKGROUND OF THE INVENTION

1. Field of the Invention

The present invention relates to electrical outlets in general, and more particularly to wall outlets of the so-called ground fault protection type.

2. Description of the Related Art

There are already known various constructions of electrical outlets, among them such that are of the ground fault protection variety, which means that they are equipped, besides the customary plug-in contacts and support and connection hardware associated with them, with a built-in electrical device of one kind or another (typically a circuit breaker and circuitry) that monitors the electric current flow to the "hot" contact (i.e. the contact supplied by the ungrounded conductor) and the "neutral" contact (i.e., the contact supplied by the grounded conductor) and interrupts the electrical continuity not only of the electrical path leading to the hot contact but also of that connected to the neutral contact when the magnitude of the difference in current between the two conductors is excessive. An example of such a ground fault protection outlet can be found in U.S. Pat. No. 4,618,907.

Such ground fault protection outlets have become more or less standard of late in new home construction, particularly as far as bathrooms, kitchens, garages, basements, outdoor outlets, or the like are concerned, especially because of the danger that a person could suffer electric shock or even become electrocuted due to one part of his or her body touching an exposed wire or other electrically conductive element that is electrically connected with the hot contact, and another part of the person's body simultaneously touching a grounded part or body, such as a faucet, water in the sink or bathtub or the like, even though still relatively low statistically, is particularly acute in this environment.

In the event that the hot and neutral supply conductors are reverse connected to their respective terminals, the ground fault protection outlet should still be able to interrupt the current to the hot contact. This is why the current ground fault protection outlets typically interrupt the electrical connection not only to the "hot" part but also to the "neutral" part of the "load" side of the electrical outlet.

Wall outlets of this kind, that is, such that are intended to be accommodated in outlet "boxes" and partially covered by wall plates (also referred to as escutcheons) are usually designed as "through" devices, that is, they are capable of being incorporated into the house wiring in that the "hot" and "neutral" wires of an electric current supply pair (line pair) are connected with a primary pair of connectors, and those of the pair leading to other electric current users (load pair) are secured to a secondary pair of connectors. The very fact that there are two pairs of connectors, and two pairs of wires to connect to them, gives rise to a strong possibility of miswiring which, if not detected and corrected during installation, could have tragic consequences later. Miswired ground fault protection outlets are thought to be widespread.

Therefore, precautions must be taken to prevent this miswiring from happening in the first place or, if permitted to occasionally occur, from persisting beyond the termination of the installation process. With the advent of relatively low electronic component prices coupled with relatively high and constantly rising labor costs, a point has been reached where it has become more economical to build certain monitoring or warning devices right into the wall outlet unit, rather than for the installer to spend additional time on trying to resolve how to properly wire the box or to figure out whether or not the outlet box is properly wired.

OBJECTS OF THE INVENTION

Accordingly, it is a general object of the present invention to avoid the disadvantages of the prior art.

More particularly, it is an object of the present invention to provide a ground fault protection electrical outlet that which does not possess the drawbacks of the known electrical outlets of this type.

Still another object of the present invention is to devise a miswiring indication circuit for use in an electrical outlet of the type here under consideration which is to give a dependable, affirmative, unambiguous change-of-state indication of a miswiring during installation.

It is yet another object of the present invention to design the above indication circuit and situate its components in such a manner as not to cause confusion in the mind of the ultimate users.

A concomitant object of the present invention is so to construct the indication circuit of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a ground fault protection electrical outlet provided with miswiring indication, which includes, in combination, a main outlet unit and a miswiring indication means built into the main outlet unit. The main outlet unit includes a housing, a primary and a secondary pair of electrical connectors arranged to be accessible from the exterior of the housing and each including a first connector and a second connector for establishing mechanical and electrical connections with a first and a second wire of a respective line wire pair and, if present, of a load wire pair, respectively, first and second connecting means for electrically connecting the first and second connectors, respectively, with one another, first and second switches interposed in the first and second connecting means, respectively and operative for being switched between their open and closed conditions, means for simultaneously switching the first and second switches between their open and closed positions, and at least one first and one second electrical contact respectively being connected with the first and second connecting means between the first and second switches and the first and second connectors of the secondary pair.

The indicator means, which is operative for indicating a miswiring situation in which the wires of a wire pair that supplies electrical current to the outlet unit are mistakenly connected to the connectors of the secondary pair, preferably includes electrically conductive auxiliary connecting means joined to the first and second connecting means between the first and second switches and the first and second connectors of the secondary pair, a current-limiting resistor, an indicator device operative for emitting a discernible warning of the miswiring situation, and an auxiliary switch switchable between its open and closed states, all interposed in series in the auxiliary connecting means, and means for coupling the auxiliary switch with the switching means for the first and second switches in such a manner that the auxiliary switch is open when the first and second switches are closed so that no current can flow through the indicator device even if the miswiring exists, and closed when the first and second switches are open so that the auxiliary connecting means constitutes the only electrical path then in existence between the first and second connecting means, enabling electric current to flow through the indicating device and activate it but only in the event of the aforementioned miswiring.

Advantageously, the indicator device is a light-emitting element, such as an incandescent bulb, a fluorescent element, or a light-emitting diode. However, it is also contemplated by the present invention for the indicator device to be constructed as a sound-generating device, or even a light reflecting device.

According to another advantageous aspect of the present invention, the electrical outlet further includes an escutcheon plate and means for mounting the escutcheon plate on the outlet unit at least when the latter is mounted in a wall outlet box in a position in which it partially conceals the outlet unit, and the indicator device is located at such a region of the unit as to be clearly visible when the escutcheon plate is absent and to be hidden from view behind the escutcheon plate when the latter is mounted on the outlet unit.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
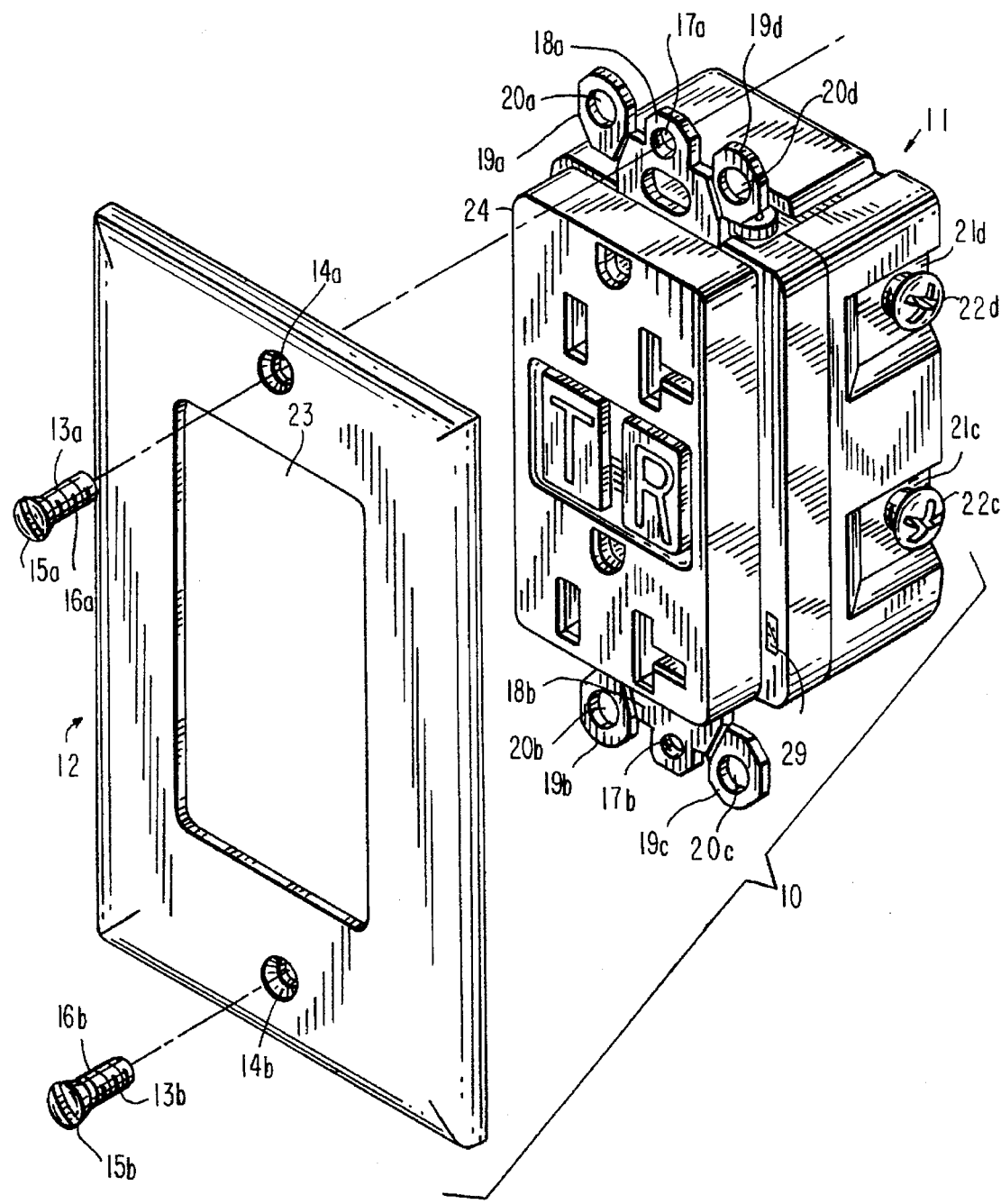
FIG. 1 is a front perspective view of a wall outlet assembly including a wall outlet proper that embodies the present invention and its associated escutcheon plate and connection hardware, in an exploded condition.

Referring now to the drawing in detail, and first to FIG. 1 thereof, it may be seen that the reference numeral 10 has been used therein to identify a wall outlet assembly embodying the present invention, in its entirety. The wall outlet assembly 10 includes, as its main components, a wall outlet proper 11 that will from time to time be referred to as a main unit; a cover plate 12 that will interchangeably also be called a wall plate or escutcheon; and two screws 13a and 13b that are to be used for connecting the escutcheon 12 to the main unit 11 in their assembled condition.

In the assembled condition of the wall outlet assembly 10, the screws 13a and 13b pass, as is well known to those with even superficial familiarity with wall outlet or switch structure, through respective through (unthreaded and countersunk) holes 14a and 14b provided for this purpose in the escutcheon 12, their heads 15a and 15b are received, at least for the most part, in the countersunk regions of the through holes 14a and 14b, and their externally threaded shanks 16a and 16b are respectively threaded into matingly internally threaded holes 17a and 17b provided in respective lugs 18a and 18b of the main unit 11. As is also well known, the purpose of the escutcheon 12 is twofold: on the practical side, it is to inhibit access to those areas that are not to be normally accessible except when there is a need for repair or replacement of the main unit 11 and/or its electrical connections to the electrical network such as the electrical wiring of a house or another residential, office, industrial or commercial building; on the cosmetic side, it is to bar view of areas surrounding the main unit 11 in its mounted condition which, more often than not, do not present a sight to behold.

The lugs 18a and 18b also have, besides and to the opposite sides of their respective regions that are provided with the threaded holes 17a and 17b, respective ears or loops 19a to 19d in which respective through apertures 20a to 20d are formed by any known manufacturing technique, usually by punching. The lugs 18a and 18b also have openings (non-numbered) through which respective non-illustrated screws extend to connect the main unit 11 to a wall outlet box of a conventional nature that also has not been illustrated in order not to unduly encumber the drawing.

It may also be observed in FIG. 1 of the drawing that the main unit 11 is also equipped with a pair of electric connectors 21d and 21c on its side facing the observer. Although not shown in FIG. 1 (but indicated in FIG. 3), the main unit 11 is further provided, in a similar or even identical fashion, with an additional pair of electric connectors 21a and 21b on its opposite side. These connectors 21a to 21d, together with associated screws 22a to 22d with which they are equipped in a known manner, serve for establishing quasi-permanent electrical and mechanical connections with respective exposed ends of electrical wires in that such end portions are inserted between the heads of the screws 22a to 22d and the connectors 21a to 21d proper and the screws 22a to 22d are then tightened, as is also well known.

Figure 2:
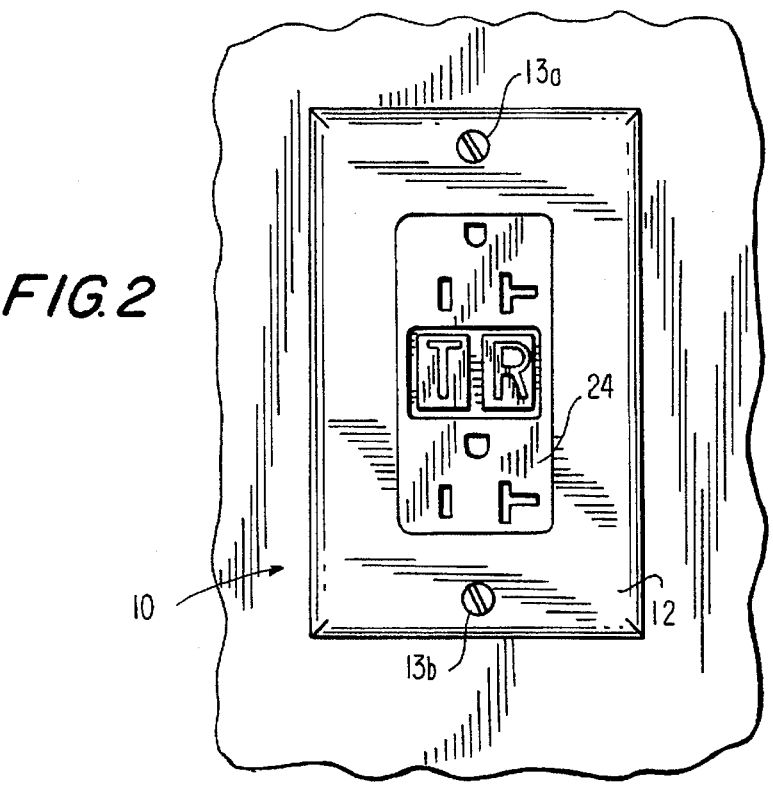
FIG. 2 is a front elevational view of the wall outlet assembly of FIG. 1 as mounted on a wall in its assembled condition.

The wall plate 12 is shown to bound a relatively large central opening 23 that serves for the passage of a complementarily shaped portion 24 of the main unit 11 therethrough. As is customary, the main unit 11 is provided with respective openings for the passage of respective electric plug contacts therethrough, as well as with test (T) and reset (R) buttons, all of them opening onto or being located at the front face of the main housing portion 24 so as to be accessible even when the escutcheon 12 is mounted on the main unit 11 and covers the remainder thereof. This is particularly well seen in FIG. 2 of the drawing that shows the assembly 10 in its mounted condition, that is, as mounted in the aforementioned non-illustrated wall outlet box that, in turn, is fixedly mounted in an appropriate opening formed in a wall.

Figure 3:
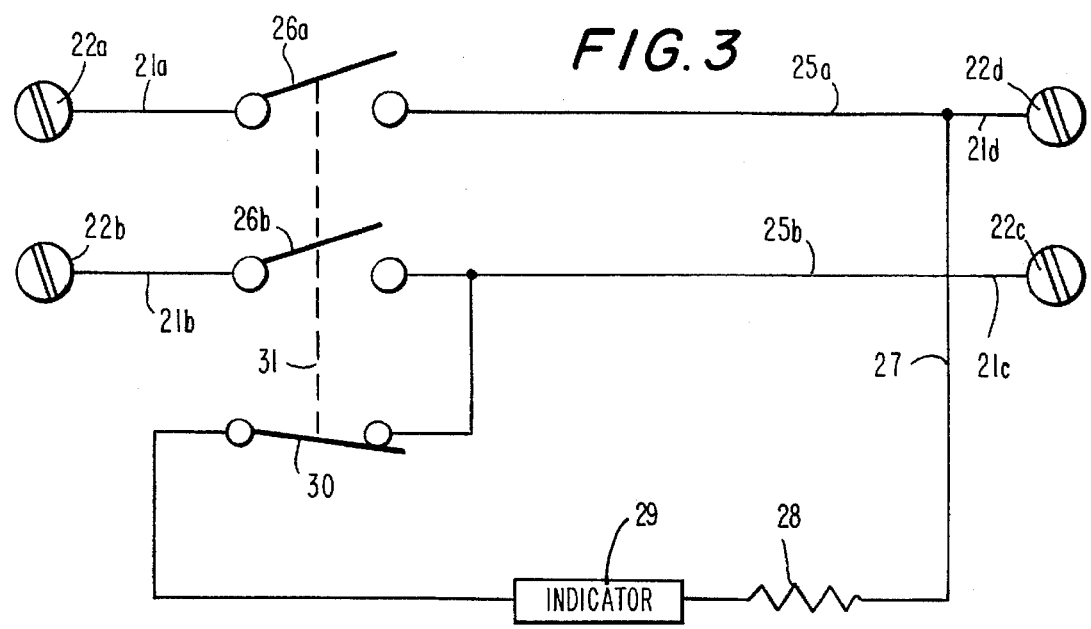
FIG. 3 is a diagrammatic view of a circuit breaker circuitry in accordance with the present invention that is installed in the wall outlet proper depicted in FIG. 1.

Turning now to FIG. 3 of the drawing, the screws of each pair 22a/22b and 22c/22d are, by convention, visually distinguished from one another in that typically those intended for the "neutral" wires are silver, and those destined for the "hot" wires are gold or brass in color, and the connector pairs 21a/21b and 21c/21d at the respective sides of the main unit 11, are to be connected with the "line" and the "load" wire pairs, respectively or according to markings identifying their respective purposes. Furthermore, the respective wires (more particularly their electrically insulating sheaths) of respective wire pairs are usually color-coded (e.g. black for the "hot" wires and white for the "neutral" wires).

Moreover, when more than a pair of wires enters the outlet box, it is also typically possible to tell, from the way the wires enter the wall outlet box, which "hot" and "neutral" wires are paired with one another. What is difficult if not impossible for a person installing the ground fault protection outlet 10 to determine with a reasonable degree of certainty, without testing while the electric power is on, is which of the wire pairs is the "load" and which the "line" pair. Yet, this determination is critical for a proper installation inasmuch as improper wiring would defeat the very purpose of using the wall outlet unit 11 of the ground fault protection variety in the first instance, in that this feature would be inoperative under these circumstances at least as far as the electric contacts of the main unit 11 are concerned.

This, however, is exactly where the present invention comes in. Rather than requiring the installing electrician or other person either to use proper measuring equipment (not always available or handy) prior to the commencement of the actual installation while the power is on to determine which pair of wires is the "line" pair, followed by a trip to a remote location to turn the power off and a trip back, hoping to remember which pair of wires has been thus identified (not necessarily a sure-fire proposition even if that person is not distracted in one way or another while making such trips), or to take (50/50) chances, connect the wires one way while the power is off, turn the power on at the remote location, cause the outlet unit 11 to assume its "tripped" (i.e. electrically non-conductive) state and then test whether or not the outlet is actually "dead" under these conditions (also not necessarily a sure bet because the outlet may be "dead" for another reason, such as by the existence of an electrical discontinuity elsewhere in the wiring), followed by turning the power off again and rewiring if the answer is in the negative, the outlet unit 11 of the present invention is provided with its own built-in miswiring indication circuitry (shown in FIG. 3) that makes it easy for the installer to make such determination with certainty after a single trip to the electric power distribution (i.e. "fuse") box.

In the situation illustrated in FIG. 3 of the drawing, the left-hand connector screws 22a and 22b are the "line" ones (the primary pair), and those on the right (22c and 22d) are the "load" ones (the secondary pair). The screws 22a and 22d on the one hand, and 22b and 22c on the other, are shown to be connected with each other by respective electrically conductive connector lines 25a and 25b that are representative of the electrical connections included within the outlet unit 11. Respective switches 26a and 26b are interposed in such lines 25a and 25b. Although not particularly shown, it is to be understood that the electrical contacts of the outlet unit 11 are located to the right of the switches 26a and 26b. This, of course, means that the electric outlet will be "dead" if the "line" wires are connected to the screws 22a and 22b and the switches 26a and 26b are in their "tripped" (i.e. open) conditions shown in FIG. 3, and "alive" otherwise.

The aforementioned miswiring indication circuitry includes an auxiliary electric line 27 that connects the "hot" line 25a with the "neutral" line 25b. Interposed in this line, in series with one another, are a current-limiter element or resistor 28, an indicator device 29 represented by a filament light bulb, and an auxiliary switch 30. The switches 26a, 26b and 30 are shown to be ganged with one another (as indicated in a broken line 31 representative of an ordinarily mechanical linkage) in such a manner that the switches 26a and 26b simultaneously assume their closed ("reset" or conductive) states at the same time that the auxiliary switch 30 is in its open (non-conductive) state, and vice versa.

Having so described the construction of the ground fault protection wall outlet assembly 10 and its built-in electric circuitry and components, the operation of the miswiring indication device of the present invention will now be described in some detail, still with reference to FIG. 3 of the drawing. It will be appreciated that, when the switches 26a and 26b are in their non-illustrated closed positions (corresponding to the condition obtained by depressing the reset button R), the switch 30 ganged therewith is in its open state, so that the indicator 29 will be inactive whether there is proper wiring or miswiring. It is only when the switches 26a and 26b are in their illustrated other positions (their "tripped" states that can be brought about by depressing the trip button T) that the indicator 29 can become operative in the first place.

Now, if there is no miswiring in this situation, then the switches 26a and 26b in their open positions prevent flow of electric current from the "line" side (22a, 22b) to the "load" side (22c, 22d) of the outlet unit 11 and thus to the electrical contacts of the latter and to the points of connection of the auxiliary line 27 to the lines 25a and 25b, so that the indicator device 29 will not be activated even though the switch 30 is closed. If, however, on the other hand, there is miswiring (i.e. the "line" wires are connected to the screws 22d and 22c instead of 22a and 22b), then, with the switch 30 in its closed condition and the switches 26a and 26b in their open positions, a limited, relatively small, amount of electric current will flow through the auxiliary line 27, thus activating the indication device 29. If the device 29 is of the illumination variety as is currently preferred, such as the illustrated incandescent bulb, a light-emitting diode, or a neon or other fluorescent light bulb or the like, it will light up, thus giving a clearly visually discernible indication of a miswiring once the electric power supply to the outlet is restored and the outlet unit 11 is in or caused to assume its "tripped" condition.

To summarize, the indicator light 29 or a similar miswiring detection or warning device, such as a buzzer or a light reflector, has no other function but to indicate to the installer the existence of miswiring. This means that not only its operation or function but even the very fact of its existence need to be known only to the installer and even then only during the installation process. As a matter of fact, it has been determined that, if the presence of the indicator 29 were apparent to the ultimate users of the wall outlet, it could lead to confusion because they may wonder about the reason for the presence of the indicator light 29 and whether or not the wall outlet was functioning properly when the light 29 did not go on at any time of actual use. To avoid this potential ground for questioning, the light 29 is mounted on such a region of the main unit 11 (right next to its protruding portion 24) where it is concealed from view by ultimate users by being covered by the escutcheon 12 when the latter is mounted on the main outlet unit 11 as it would be during normal use, while being clearly visible during the installation process for the duration of which the wall plate 12 is off.

It will be understood that each of the elements described above, or two or more together, may also find a useful application in other types of constructions differing from the type described above.

While the present invention has been described and illustrated herein as embodied in a specific construction of an electrical wall outlet provided with a miswiring warning device, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A ground fault protection electrical outlet with miswiring indication comprising:

a) a main outlet unit including a housing, a primary and a secondary pair of electrical connectors arranged to be accessible from the exterior of said housing and each including a first connector and a second connector for establishing mechanical and electrical connections with a first and a second wire of a respective line wire pair and, if present, of a load wire pair, respectively, first and second connecting means for electrically connecting said first and second connectors, respectively, with one another, first and second switches interposed in said first and second connecting means, respectively and operative for being switched between their open and closed conditions, means for simultaneously switching said first and second switches between their open and closed positions, and at least one first and one second electrical contact being respectively connected with said first and second connecting means between said first and second switches and said first and second connectors of said secondary pair; and b) indicator means built into said main outlet unit by way of said at least one first and second electrical contacts and operative for indicating a miswiring situation in which the wires of a wire pair that supplies electrical current to said outlet unit are mistakenly connected to said connectors of said secondary pair, said indicator means including an indicator device having two states, and being operative for affirmatively changing the indicator device from one of said states to the other in the event of said miswiring.

2. The electrical outlet as defined in claim 1, wherein said indicator device is a light-emitting element.

3. The electrical outlet as defined in claim 2, wherein said light-emitting element is an incandescent bulb.

4. The electrical outlet as defined in claim 2, wherein said light-emitting element is a fluorescent element.

5. The electrical outlet as defined in claim 2, wherein said light-emitting element is a light-emitting diode.

6. The electrical outlet as defined in claim 1, wherein said indicator device is a sound-generating device.

7. The electrical outlet as defined in claim 1, further comprising an escutcheon plate and means for mounting said escutcheon plate on said outlet unit at least when the latter is mounted in a wall outlet box in a position in which it partially conceals said outlet unit; and wherein said indicator device is located at such a region of said unit as to be clearly visible when the escutcheon plate is absent and to be hidden from view behind said escutcheon plate when the latter is mounted on said outlet unit.

8. A ground fault protection electrical outlet with miswiring indication comprising:

a) a main outlet unit including a housing, a primary and a secondary pair of electrical connectors arranged to be accessible from the exterior of said housing and each including a first connector and a second connector for establishing mechanical and electrical connections with a first and a second wire of a respective line wire pair and, if present, of a load wire pair, respectively, first and second connecting means for electrically connecting said first and second connectors, respectively, with one another, first and second switches interposed in said first and second connecting means, respectively and operative for being switched between their open and closed conditions, means for simultaneously switching said first and second switches between their open and closed positions, and at least one first and one second electrical contact being respectively connected with said first and second connecting means between said first and second switches and said first and second connectors of said secondary pair; and b) indicator means built into said main outlet unit and operative for indicating a miswiring situation in which the wires of a wire pair that supplies electrical current to said outlet unit are mistakenly connected to said connectors of said secondary pair, including electrically conductive auxiliary connecting means joined to said first and second connecting means between said first and second switches and said first and second connectors of said secondary pair, a current-limiting element, an indicator device operative for emitting a discernible warning of said miswiring situation, and an auxiliary switch switchable between its open and closed states, all interposed in series in said auxiliary connecting means, and means for coupling said auxiliary switch with said switching means for said first and second switches in such a manner that said auxiliary switch is open when said first and second switches are closed so that no current can flow through said indicator device even if said miswiring exists, and closed when said first and second switches are open so that said auxiliary connecting means constitutes the only electrical path then in existence between said first and second connecting means, enabling electric current to flow through said indicator device and activate it but only in the event of said miswiring.

9. The electrical outlet as defined in claim 8, wherein said indicator device is a light-emitting element.

10. The electrical outlet as defined in claim 9, wherein said light-emitting element is an incandescent bulb.

11. The electrical outlet as defined in claim 9, wherein said light-emitting element is a fluorescent element.

12. The electrical outlet as defined in claim 9, wherein said light-emitting element is a light-emitting diode.

13. The electrical outlet as defined in claim 8, wherein said indicator device is a sound-generating device.

14. The electrical outlet as defined in claim 8, further comprising an escutcheon plate and means for mounting said escutcheon plate on said outlet unit at least when the latter is mounted in a wall outlet box in a position in which it partially conceals said outlet unit; and wherein said indicator device is located at such a region of said unit as to be clearly visible when the escutcheon plate is absent and to be hidden from view behind said escutcheon plate when the latter is mounted on said outlet unit.

* * * * *